US009672514B2

(12) United States Patent
Pinkas et al.

(10) Patent No.: US 9,672,514 B2
(45) Date of Patent: Jun. 6, 2017

(54) SYSTEMS AND METHODS FOR CONDUCTING TRANSACTIONS AND COMMUNICATIONS USING A TRUSTED THIRD PARTY

(71) Applicant: Intertrust Technologies Corporation, Sunnyvale, CA (US)

(72) Inventors: Binyamin Pinkas, Jersey City, NJ (US); Tomas Sander, New York, NY (US); William G. Horne, Lawrenceville, NJ (US)

(73) Assignee: Intertrust Technologies Corp., Santa Clara, CA (US)

( * ) Notice: Subject to any disclaimer, the term of this patent is extended or adjusted under 35 U.S.C. 154(b) by 105 days.

(21) Appl. No.: 14/839,125

(22) Filed: Aug. 28, 2015

(65) Prior Publication Data
US 2016/0155119 A1   Jun. 2, 2016

Related U.S. Application Data

(63) Continuation of application No. 14/071,574, filed on Nov. 4, 2013, now Pat. No. 9,123,043, which is a
(Continued)

(51) Int. Cl.
  *G06Q 40/00* (2012.01)
  *G06Q 20/38* (2012.01)
(Continued)

(52) U.S. Cl.
  CPC ......... *G06Q 20/3829* (2013.01); *G06Q 20/02* (2013.01); *G06Q 20/401* (2013.01); *G06Q 30/06* (2013.01); *G06Q 2220/00* (2013.01)

(58) Field of Classification Search
  CPC .. G06Q 20/3829; G06Q 20/02; G06Q 20/401; G06Q 30/06; G06Q 2220/00
  See application file for complete search history.

(56) References Cited

U.S. PATENT DOCUMENTS 4,827,508 A   5/1989 Shear
4,977,594 A   12/1990 Shear
(Continued)

FOREIGN PATENT DOCUMENTS

EP   0 715 247 A1   6/1996
WO   WO 96/27155 A3   9/1996
(Continued)

OTHER PUBLICATIONS

Dwork, C. et al., "Digital Signets: Self Enforcing Protection of Digital Information," Proceedings of the Twenty-Eighth Annual ACM Symposium on the Theory of Computing, May 22-24, 1996, pp. 489-498, Philadelphia, PA.
(Continued)

*Primary Examiner* — Mary Cheung
(74) *Attorney, Agent, or Firm* — Finnegan, Henderson, Farabow, Garrett & Dunner, LLP.

(57) ABSTRACT

Systems and methods are provided for performing transactions and managing communications using a trusted third party. In one embodiment, a sender transfers an encrypted version of a file (such as a digitally encoded audio track, movie, document, or the like) to someone who wishes to receive it. The receiver computes a first hash of at least a portion of the encrypted data content, and sends the first hash to a third party configured to compare at least a portion of the first hash to at least a portion of a second hash. The receiver receives a file decryption key from the third party, and decrypts at least the portion of the received encrypted data content with the decryption key. In some cases, multiple hashes of the encrypted data content may be computed, each using a different portion of the encrypted data content.

18 Claims, 5 Drawing Sheets

Related U.S. Application Data continuation of application No. 13/478,042, filed on May 22, 2012, now Pat. No. 8,577,812, which is a continuation of application No. 12/895,510, filed on Sep. 30, 2010, now Pat. No. 8,185,478, which is a continuation of application No. 11/590,319, filed on Oct. 30, 2006, now Pat. No. 7,827,114, which is a continuation of application No. 10/128,182, filed on Apr. 22, 2002, now Pat. No. 7,136,840.

(60) Provisional application No. 60/285,120, filed on Apr. 20, 2001.

(51) Int. Cl.
 G06Q 20/40 (2012.01)
 G06Q 30/06 (2012.01)
 G06Q 20/02 (2012.01)

(56) References Cited

U.S. PATENT DOCUMENTS

| | | | |
|---|---|---|---|
| 5,050,213 | A | 9/1991 | Shear |
| 5,410,598 | A | 4/1995 | Shear |
| 5,530,235 | A | 6/1996 | Stefik et al. |
| 5,534,975 | A | 7/1996 | Stefik et al. |
| 5,566,230 | A | 10/1996 | Cairo |
| 5,629,980 | A | 5/1997 | Stefik et al. |
| 5,634,012 | A | 5/1997 | Stefik et al. |
| 5,638,443 | A | 6/1997 | Stefik et al. |
| 5,638,446 | A | 6/1997 | Rubin |
| 5,715,403 | A | 2/1998 | Stefik |
| 5,809,116 | A | 9/1998 | Cairo |
| 5,809,144 | A | 9/1998 | Sirbu et al. |
| 5,815,555 | A | 9/1998 | Cairo |
| 5,892,900 | A | 4/1999 | Ginter et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,861 | A | 7/1999 | Hall et al. |
| 5,940,504 | A | 8/1999 | Griswold |
| 5,943,422 | A | 8/1999 | Van Wie et al. |
| 5,949,876 | A | 9/1999 | Ginter et al. |
| 5,956,154 | A | 9/1999 | Cairo |
| 5,982,891 | A | 11/1999 | Ginter et al. |
| 5,999,949 | A | 12/1999 | Crandall |
| 6,112,181 | A | 8/2000 | Shear et al. |
| 6,138,119 | A | 10/2000 | Hall et al. |
| 6,157,721 | A | 12/2000 | Shear et al. |
| 6,185,683 | B1 | 2/2001 | Ginter et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,263,436 | B1 | 7/2001 | Franklin et al. |
| 6,292,569 | B1 | 9/2001 | Shear et al. |
| 6,363,488 | B1 | 3/2002 | Ginter et al. |
| 6,381,695 | B2 | 4/2002 | Kudo et al. |
| 6,389,402 | B1 | 5/2002 | Ginter et al. |
| 6,427,140 | B1 | 7/2002 | Ginter et al. |
| 6,449,367 | B2 | 9/2002 | Van Wie et al. |
| 6,510,513 | B1 | 1/2003 | Danieli |
| 6,618,484 | B1 | 9/2003 | Van Wie et al. |
| 6,640,304 | B2 | 10/2003 | Ginter et al. |
| 6,658,568 | B1 | 12/2003 | Ginter et al. |
| 6,668,325 | B1 | 12/2003 | Collberg et al. |
| 6,785,815 | B1 | 8/2004 | Serret-Avila et al. |
| 6,820,202 | B1 | 11/2004 | Wheeler et al. |
| 6,832,316 | B1 | 12/2004 | Sibert |
| 7,136,840 | B2 | 11/2006 | Pinkas |
| 7,827,114 | B2 | 11/2010 | Pinkas |
| 8,185,478 | B2 | 5/2012 | Pinkas |
| 8,577,812 | B2 | 11/2013 | Pinkas |
| 2001/0042043 | A1 | 11/2001 | Shear et al. |
| 2002/0023214 | A1 | 2/2002 | Shear et al. |
| 2002/0048369 | A1 | 4/2002 | Ginter et al. |
| 2002/0087859 | A1 | 7/2002 | Weeks et al. |
| 2002/0112171 | A1 | 8/2002 | Ginter et al. |
| 2002/0143710 | A1 | 10/2002 | Liu |
| 2002/0152173 | A1 | 10/2002 | Rudd |
| 2003/0023856 | A1 | 1/2003 | Horne et al. |
| 2003/0041239 | A1 | 2/2003 | Shear et al. |
| 2003/0046244 | A1 | 3/2003 | Shear et al. |
| 2003/0069748 | A1 | 4/2003 | Shear et al. |
| 2003/0069749 | A1 | 4/2003 | Shear et al. |
| 2003/0105721 | A1 | 6/2003 | Ginter et al. |
| 2003/0163431 | A1 | 8/2003 | Ginter et al. |
| 2004/0054630 | A1 | 3/2004 | Ginter et al. |
| 2004/0059951 | A1 | 3/2004 | Pinkas et al. |
| 2004/0073813 | A1 | 4/2004 | Pinkas et al. |
| 2004/0103305 | A1 | 5/2004 | Ginter et al. |
| 2004/0107356 | A1 | 6/2004 | Shamoon et al. |
| 2004/0123129 | A1 | 6/2004 | Ginter et al. |
| 2004/0133793 | A1 | 7/2004 | Ginter et al. |
| 2005/0027871 | A1 | 2/2005 | Bradley et al. |
| 2005/0050332 | A1 | 3/2005 | Serret-Avila et al. |
| 2005/0060560 | A1 | 3/2005 | Sibert |
| 2005/0060584 | A1 | 3/2005 | Ginter et al. |
| 2005/0108555 | A1 | 5/2005 | Sibert |

FOREIGN PATENT DOCUMENTS

| | | |
|---|---|---|
| WO | WO 97/07657 A2 | 3/1997 |
| WO | WO 97/43761 A2 | 11/1997 |
| WO | WO 98/09209 A1 | 3/1998 |
| WO | WO 98/10381 A1 | 3/1998 |
| WO | WO 98/37481 A1 | 8/1998 |
| WO | WO 99/01815 A1 | 1/1999 |
| WO | WO 99/24928 A2 | 5/1999 |
| WO | WO 99/48296 A1 | 9/1999 |
| WO | WO 00/75925 A1 | 12/2000 |
| WO | WO 01/06374 A2 | 1/2001 |
| WO | WO 01/09702 A2 | 2/2001 |
| WO | WO 01/10076 A2 | 2/2001 |

OTHER PUBLICATIONS

Merkle, R.C., "Protocols for Public Key Cryptosystems," Proceedings of the IEEE Symposium on Research in Security and Privacy, Apr. 1980, pp. 122-134, Oakland, CA.

Reed, I.S. et al., "Polynomial Codes over Certain Finite Fields," SIAM Journal on Applied Mathematics (SIAP), pp. 300-304,1960, vol. 8, Issue 2.

Sibert, O. et al., "Digibox: A Self-Protecting Container for Information Commerce," Proceedings of the First USENIX Workshop on Electronic Commerce, Jul. 1995, 13 pages, New York, NY.

Sibert, O. et al., "Securing the Content, Not the Wire, for Information Commerce," 1996, 12 pages, InterTrust Technologies Corporation.

Stefik, M., "Introduction to Knowledge Systems, Chapter 7: Classification," 1995, pp. 543-607, Morgan Kaufmann Publishers, Inc., San Francisco, CA.

Stefik, M., "Letting Loose the Light: Igniting Commerce in Electronic Publication," 1994-1995, 35 pages, Xerox PARC, Palo Alto, CA.

Stefik, M., "Letting Loose the Light: Igniting Commerce in Electronic Publication," Internet Dreams: Archetypes, Myths, and Metaphors, 1996, pp. 219-253, Massachusetts Institute of Technology.

Stefik, M., "Trusted Systems," Scientific American, Mar. 1997, pp. 78-81.

Abadi, M. et al., "Certified Email with a Light On-Line Trusted Third Party: Design and Implementation," WWW2002, May 7-11, 2002, Honolulu, Hawaii, USA, 9 pages.

Asokan, N. et al., "Asynchronous Protocols for Optimistic Fair Exchange," In IEEE Symposium on Research in Security and Privacy, 14 pages, IEEE Computer Society Press, 1998.

Asokan, N. et al., "Optimistic Fair Exchange of Digital Signatures," EuroCrypt 98, 34 pages, Springer-Verlag, 1998.

Ateniese, G. et al., "Stateless-Recipient Certified E-mail System based on Verifiable Encryption," In B. Preneel, editor, Topics in

(56) References Cited

OTHER PUBLICATIONS

Cryptology-CT-RSA 2002, vol. 2271 of Lecture Notes in Computer Science, 18 pages, Springer-Verlag, 2002.
Ateniese, G. et al., "TRICERT: A Distributed Certified E-Mail Scheme," In ISOC 2001 Network and Distributed System Security Symposium, San Diego, CA, USA Feb. 2000, 27 pages.
"*Information Security, Data Protection: Authentica Enterprise DRM Software*," http://www.authentica.com, 2 pages.
Bahreman, A. et al., Certified electronic mail, Proceedings of the Internet Society Symposium on Network and Distributed System Security, Internet Society. Feb. 1994, pp. 3-19.
Boneh, D., "Simplified OAEP for the Rabin and RSA Functions," In J. Kilian, editor, CRYPTO '01, Springer-Verlag 2001, 13 pages.
Boneh, D., et al., "Timed Commitments (Extended Abstract)," In M. Bellare, editor, CRYPTO '00, Springer-Verlag, 2000, 19 pages.
Borenstein, N. et al., "MIME (Multipurpose Internet Mail Extensions) Part One: Mechanisms for Specifying and Describing the Format of Internet Message Bodies," Network Working Group, Sep. 1993, Section 5.2, 75 pages.
"Certified Mail: Secure Messaging System," http://www.certifiedmail.com, 2 pages.
Cleve, R., "Controlled Gradual Disclosure Schemes for Random Bits and Their Applications," Advances in Cryptology-CRYPTO '89 (University of California Santa Barbara) (G. Brassard, ed., Springer-Verlag, 1990), 18 pages.
Cramer, R., et al., "A Practical Public Key Cryptosystem Provably Secure against Adaptive Chosen Ciphertext Attack," In CRYPTO '88, pp. 1-13.
Damgard, I.B., "Practical and Provably Secure Release of a Secret and Exchange of Signatures," EUROCRYPT '93, vol. 765 of Lecture Notes in Computer Science, 1998, Springer-Verlag, pp. 200-217.
Deng, R.H., et al., "Practical Protocols for Certified Electronic Mail," Journal of Network Systems and Management, 3(4), 1996, pp. 1-21.
Dolev, D., et al., "Non-Malleable Cryptography," $23^{rd}$ Symposium on Theory of Computing, updated version Mar. 24, 2000, 55 pages.
Domingo-Ferrer, J. et al., "Full Secure Key Exchange and Authentication with No Previously Shared Secrets," In J.J. Quisquater and J. Vandewalle, ed., Advances in Cryptology-EUROCRYPT '89, LNCS Springer-Verlag Berlin Heidelberg 1990, pp. 665-669.
Even, S. et al., "A Randomized Protocol for Signing Contracts (Extended Abstract)," Computer Science Department, Technion-Israel Institute of Technology, 1998, Springer-Verlag, pp. 205-210.
Fajman, R., "An Extensible Message Format for Message Disposition Notifications," National Institutes of Health, Mar. 1998, pp. 1-28.
Ferrer-Gomila, J.L. et al., "An Efficient Protocol For Certified Electronic Mail," Proceedings from The Third International Information Security Workshop on Information Security—ISW 2000,Wollongong, Australia, Dec. 20-21, 2000, Springer-Verlag, pp. 237-248.

Franklin, M., et al, "Fair Exchange with a Semi-Trusted Third Party (extended abstract)," Proceedings of the $4^{th}$ ACM Conference on Computer Communications Security, Zurich Switzerland, Apr. 1997, pp. 1-6.
Fujisaki, E., et al., "RSA-OAEP Is Secure under the RSA Assumption," Journal of Cryptology, vol. 17, No. 3, Springer-Verlag, 2004, 24 pages.
Goldreich, O., "Sending Certified Mail Using Oblivious Transfer and a Threshold Scheme," Technical Report #325, Department of Computer Science, Technion-Israel Institute of Technology, revised Jul. 1984, pp. 1-7.
Mut-Puigserver, M. et al., "Certified Electronic Mail Protocol Resistant to a Minority of Malicious Third Parties," Proceedings of the IEEE Conference on Computer Communications—INFOCOM '00, 2000, pp. 1401-1405.
Pfitzmann, B., et al., "Provably Secure Certified Mail," Technical Report RZ 3207 (93253), IBM, Research Division, Zurich, Switzerland, updated Aug. 2000, 40 pages.
*POSTX: Simple Email Encryption*, http://www.postx.com, 2 pages.
Schneider, B., et al., "A Certified E-Mail Protocol," Proceedings of the $13^{th}$ Annual Computer Security Applications Conference, Dec. 1998, ACM Press, 6 pages.
Shoup, V., "OAEP Reconsidered," Advances in Cryptology-CRYPTO '01 (J. Killian, ed., Springer-Verlag, 2001), 27 pages.
*SIGABA—Secure Messaging Solutions: Secure Email, Secure IM, Secure Statements for Protected Document Delivery*, http://www.sigaba.com, 2 pages.
*ZIXCORP: Secure Business Email, Encryption and Privacy*, http://www.zixcorp.com, 2 pages.
Zhou, J., et al., "Certified Electronic Mail," In Computer Security; ESORICS '96 Proceedings, Springer-Verlag, 1996, 12 pages.
Stallings, "Confidentially Speaking," LAN Magazine, 9(8):49 (4), Aug. 1994.
Office Action mailed Feb. 22, 2005, for U.S. Appl. No. 10/128,182, filed Apr. 22, 2002.
Office Action mailed Nov. 8, 2005, for U.S. Appl. No. 10/128,182, filed Apr. 22, 2002.
Notice of Allowance mailed Sep. 5, 2006, for U.S. Appl. No. 10/128,182, filed Apr. 22, 2002.
Office Action mailed Jan. 14, 2010, for U.S. Appl. No. 11/590,319, filed Oct. 30, 2006.
Notice of Allowance mailed Jun. 24, 2010, for U.S. Appl. No. 11/590,319, filed Oct. 30, 2006.
Office Action mailed Sep. 15, 2011, for U.S. Appl. No. 12/895,510, filed Sep. 30, 2010.
Notice of Allowance mailed Jan. 31, 2012, for U.S. Appl. No. 12/895,510, filed Sep. 30, 2010.
Office Action mailed Jan. 4, 2013, for U.S. Appl. No. 13/478,042, filed Jan. 4, 2013.
Notice of Allowance mailed Jul. 12, 2013, for U.S. Appl. No. 13/478,042, filed May 22, 2012.
Notice of Allowance mailed Apr. 30, 2015, for U.S. Appl. No. 14/071,574, filed Nov. 4, 2013.

SYSTEMS AND METHODS FOR CONDUCTING TRANSACTIONS AND COMMUNICATIONS USING A TRUSTED THIRD PARTY

RELATED APPLICATIONS

This application is a continuation of U.S. application Ser. No. 14/071,574, filed Nov. 4, 2013 (now U.S. Pat. No. 9,123,043), which is a continuation of U.S. application Ser. No. 13/478,042, filed May 22, 2012 (now U.S. Pat. No. 8,577,812), which is a continuation of U.S. application Ser. No. 12/895,510, filed Sep. 30, 2010 (now U.S. Pat. No. 8,185,478), which is a continuation of U.S. application Ser. No. 11/590,319, filed Oct. 30, 2006 (now U.S. Pat. No. 7,827,114), which is a continuation of U.S. application Ser. No. 10/128,182, filed Apr. 22, 2002 (now U.S. Pat. No. 7,136,840), which claims the benefit of U.S. Provisional Application No. 60/285,120, filed Apr. 20, 2001, all of which are hereby incorporated by reference in their entireties.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to communication and transaction management. More specifically, systems and methods are disclosed for securely performing transactions and communications using a trusted third party.

BACKGROUND OF THE INVENTION

The present invention relates generally to systems and methods for electronic communication. More specifically, the present invention relates to systems and methods for managing communications between computer systems involved in a transaction. Recent advances in computing and networking technology have enabled a variety of new types of commercial transactions between physically remote parties. For example, many vendors operate Internet web sites at which consumers can purchase the vendor's goods using a credit card or other form of payment. The goods are shipped to the consumer typically after the payment is received. One class of transactions that is growing in importance involves the sale of digital goods, such as digitally-recorded songs, movies, images, books, reports, and the like. The nature of digital goods allows them to be transported over a computer network with relative ease, and/or stored on readily-available and inexpensive storage media, such as diskettes, compact discs (CDs), and the like. Therefore, transactions involving digital goods are able to occur virtually instantaneously, as digital goods can be transmitted over the network from the vendor's computer system to the purchaser's computer system in little time.

In other types of transactions, a copy of a digital work might already reside on the consumer's computer system at the time the consumer wishes to purchase it. For example, the consumer may have obtained a copy from a friend, downloaded a copy from the Internet, or obtained a copy by some other means. The content may be encrypted or otherwise packaged so that it cannot be accessed without payment, and the consumer may thus need to contact the content owner or the owner's agent in order to gain access. For example, the consumer may provide the content owner with a credit card payment in exchange for a cryptographic key or other means of unpacking the content.

There is also an increasing demand for even more flexible business arrangements. For example, a content vendor may wish to allow consumers to purchase content on a pay-per-use basis, and/or may wish to allow consumers to pay for content in a non-traditional manner—such as by allowing the vendor to collect information regarding the consumer's content-usage habits. To facilitate arrangements such as these, a content vendor may provide the consumer with a special rights-management application program that runs on the consumer's computer system and enforces the terms of the consumer's contract with the vendor.

A problem that arises in distributed electronic transactions such as those described above is that of managing the risk borne by content creators and distributors when their content is used by, or distributed to, consumers. For example, content owners will typically wish to prevent consumers from stealing their content and distributing it to others, and will also wish to prevent consumers from circumventing the technical mechanisms by which transactions are conducted and enforced. However, it is desirable to manage this risk in a manner that does not unduly compromise the consumer's content-usage experience, as the more difficult it is for a consumer to access and use electronic content, the less likely it is that the consumer will use it, and thus anti-piracy measures intended to prevent a loss of revenue to the content provider can have the opposite effect. Systems and methods are thus needed for enabling content providers to manage risk flexibly and efficiently, in a manner that accounts for and reduces the impact that risk management decisions have on the end user's experience, and thus on the overall desirability and distribution of the content.

SUMMARY OF THE INVENTION

Systems and methods are presented that enable parties to exchange information in a trusted manner, ensuring that none of the parties can end the exchange prematurely after obtaining their desired output but without allowing the other parties to obtain their output. The system uses a trusted party, the escrow server, which can be implemented using relatively little resources. The system can be generalized to accommodate many escrow servers such that only collusion between a large number of them would be able to cheat a user of the system.

A major application is an escrow server for peer-to-peer networks in which parties exchange content or files. The recipients of content are able to verify its quality, and the sender of the content is ensured of being paid. Another application is an implementation of a certified mail service.

In some embodiments, the sender computes the hash of the encrypted file and sends it directly to the third party. Another contribution is a method that enables a server to produce many encryptions of a single file that have the following property: A third party, after running an initial interaction with the server, can examine whether a given ciphertext is an encryption of the file by running an operation whose overhead is much smaller than encrypting the plaintext file and comparing the result with the ciphertext.

In one embodiment, a method for transferring a file between two parties is provided. The sender transfers an encrypted version of the file to the receiver. The receiver computes a hash of the encrypted file, and sends it to a trusted third party. The trusted third party compares the hash computed by the receiver with another hash computed by the sender. If the two hashes match, the third party sends the decryption key for the file to the receiver. In some embodiments, the receiver may also send the third party payment information so that the sender, the content owner, and/or the third party can be paid for their role in the transaction. In a preferred embodiment, the payment information is only sent to, and/or used by, the third party once the third party has confirmed to the satisfaction of the receiver that the encrypted file in the receiver's possession will decrypt correctly. In some embodiments, the sender computes the hash of the encrypted file and sends it directly to the third party. In other embodiments, the sender encrypts this hash using a key associated with the third party, and sends the encrypted hash to the receiver, who then forwards it to the third party.

It should be appreciated that the present invention can be implemented in numerous ways, including as a process, an apparatus, a system, a device, a method, or a computer readable medium. Several inventive embodiments of the present invention are described below.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. For example, while embodiments are described in the context of a system and method for conducting transactions in a peer-to-peer environment, those skilled in the art will recognize that the disclosed systems and methods are readily adaptable for broader application. For example, without limitation, the present invention could be readily applied in the context of client-server, or virtually any other type of environment. In addition, while numerous specific details are set forth in the following description in order to provide a thorough understanding of the present invention, the present invention may be practiced without some or all of these details. Moreover, for the purpose of clarity, certain technical material that is known in the art related to the invention has not been described in detail in order to avoid unnecessarily obscuring the present invention.

Figure 1:
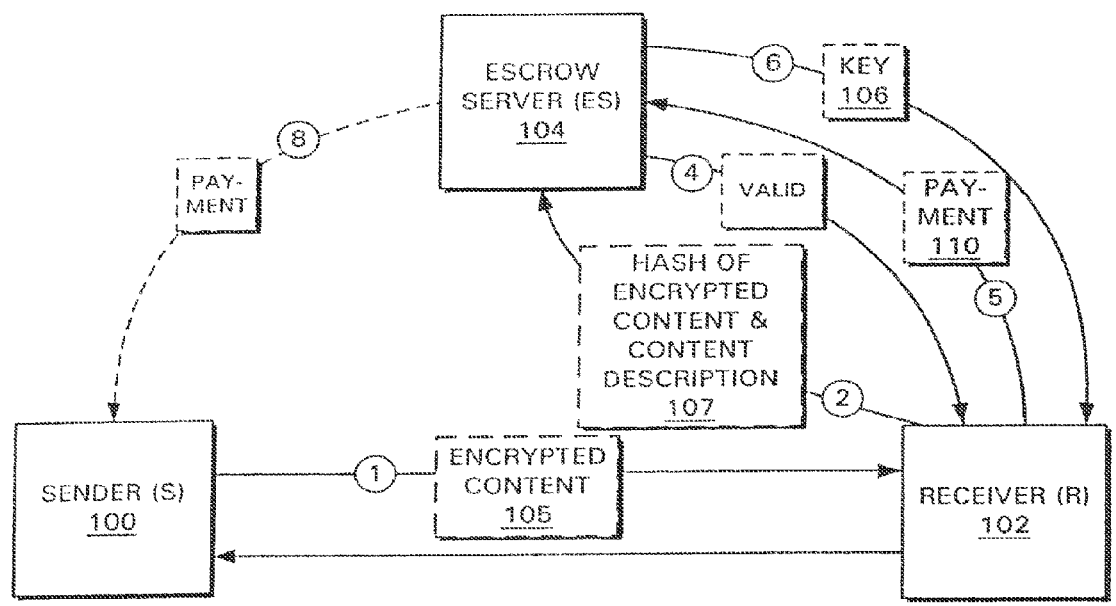
FIG. 1 illustrates a communications protocol in accordance with one embodiment of the present invention.

FIG. 1 illustrates a system and protocol in accordance with embodiments of the present invention. Referring to FIG. 1, the system includes the following general elements: (1) parties that serve (or send) content 100, denoted by S, (2) parties that receive content 102, denoted by R and (3) an escrow server 104, denoted by ES.

To facilitate explanation, assume that there are many servers and recipients of content, but only a single escrow server 104 whose identity is known to all parties. Also assume that the escrow server is a trusted and respectable party that does not try to maliciously cheat other parties, and that, as a result, disputes between the escrow server and other parties can be resolved rather easily. For the sake of discussion, it will also be assumed that the parties agree on the following cryptographic primitives: (1) a symmetric encryption scheme E, such as DES or Rijndael; and (2) a collision resistant hash function H. This function is preferably one for which it is infeasible to find two values x and y such that $H(x)=H(y)$. This function could, for example, be realized using SHA-1 or MD5. It will also be assumed that it is possible to have secure and authenticated channels between any two parties, if desired. This could be achieved using public key cryptography (e.g., by using SSL or IPSEC). In some embodiments, parties need to encrypt information that can be later read by the escrow server 104. Because this may be done non-interactively, SSL and IPSEC will generally not be suitable. Thus, in these embodiments the encryption is preferably done using public key cryptography, or using symmetric keys which are shared between the escrow server 104 and each of the other relevant parties.

A general embodiment of the invention will first be described, followed by a description of various ways to tune it to obtain different properties. It will be assumed that sender 100 is willing to serve content that is requested by recipient 102. It will also be assumed that recipient 102 is able to determine that server 100 is willing to serve content, and that these two parties can agree on the terms of a transaction by which receiver 102 will obtain content from server 100. The terms preferably include a description of the content and the payment that receiver 102 will make. To simplify the initial description of the system, it will be assumed that the price of content does not depend on the identity of server 100 and receiver 102, and is known to the escrow server 104.

Content delivery can be performed using steps depicted shown in FIG. 1 and in Table 1 below. As shown in FIG. 1, server 100 prepares an encrypted version of the content 105, $E_K(C)$, e.g., by encrypting content, C, with a randomly chosen key 106, K. Server 100 sends $E_K(C)$ 105 to receiver 102 (i.e., step 1 in Table 1 and FIG. 1). Receiver 102 would like to decrypt this message. In order to obtain the key 106, it computes the hash of the encrypted content, $H(E_K(C))$ 107, and sends it to the escrow server 104, together with a description of the content it desires to obtain (step 2). The escrow server 104 knows the correct hash of the encrypted content, $H(E_K(C))$ 107, and the key 106 that decrypts the content. There are several ways in which this information can become known to the escrow server 104, which will be discussed below. For now, assume that server 100 sent the pair [K, $E_K(C)$] to escrow server 104 in a preprocessing stage, and that escrow server 104 verified that key 106 was able to correctly decrypt the content. The escrow server 104 compares the hash it received from receiver 102 to the hash it had previously stored (step 3). If the two hash values match, the escrow server 104 informs the receiver 102 that it received a legitimate encryption of the content (step 4). Receiver 102 then sends the required payment 110 to escrow server 104 (step 5). The escrow server 104 verifies the payment 110, and, if it is valid, sends key 106 to receiver 102 (step 6). If, however, the hash value that escrow server 104 received from receiver 102 does not match the previously stored value, escrow server 104 notifies receiver 102 that sender 100 sent it an illegitimate or corrupted copy of the content. In this case, receiver 102 is not required to pay anything and the protocol ends. If it is desirable to enable the system to take further action against sender 100, messages sent from sender 100 to receiver 102 could be signed, thereby enabling proof that server 100 actually sent the defective content.

It should be appreciated that a number of variations can be made to the above-described scheme without departing from the principles of the invention. For example, the steps described above could be merged into a single back-and-forth round between receiver 102 and escrow server 104. Namely, receiver 102 could send its first message to escrow server 104 together with the payment 110 that it should pay if the encryption of the content is valid. Escrow server 104 would examine the hash, and, if it is correct, process the payment and send receiver 102 the key 106. Receiver 102 would receive the key 106 and use it to decrypt $E_K(C)$ 105 and obtain the content (step 7). In some embodiments, escrow server 104 forwards part of receiver's 102 payment 110 to sender 100 according to the terms of predefined agreements, and might keep part of the payment 110 as its own fee (step 8 in FIG. 1).

TABLE 1

| | Sender | Receiver | | Escrow Server |
|---|---|---|---|---|
| 0 | C, Ek(C) | | | H(Ek(C)), K |
| 1 | | Ek(C)→ | | |
| 2 | | Ek(C) | H(Ek(C)))→ | |
| 3 | | | | Compare two hashes |
| 4 | | | ←"Hashes are equal" | |
| 5 | | | Payment→ | |
| 6 | | | ←-K | |
| 7 | | Decrypt using K | | |

The security of the system is based largely on the trustworthiness of escrow server 104. The two simple propositions set forth below basically state that if escrow server 104 behaves according to the protocol, then both receiver 102 and sender 100 will receive their required outputs. Therefore, if any of the peers decides that it did not receive the correct output from the protocol, it should challenge the operation of the escrow server 104, rather than challenge the operation of the other peer. A dispute between a peer and the escrow server is similar to a dispute between a consumer and a business, and should be relatively easy to resolve (at least in comparison to disputes between peers).

Proposition 1:

If the receiver 102 pays the escrow server 104 and the escrow server 104 behaves according to the protocol, then receiver 102 is able to obtain the content, or else the escrow server is convinced that the sender 100 did not act according to the protocol.

The following rationale supports this proposition. In the beginning of the protocol, the escrow server 104 obtains a pair of values [α, β], that should correspond to α=H($E_K(C)$) and β=K. Consider the following two cases:

Assume that the values [α, β] that are held by the escrow server 104 correspond to the hash of the encrypted content and to the decryption key 106. If the receiver 102 receives $E_K(C)$ from sender 100, then the protocol ensures that the receiver 102 receives the key 106 from the escrow server 104 which enables it to decrypt the content. If the receiver 102 receives a different value, y, from the sender 100, then the collision resistance of H implies that H(y)≠α, since it is infeasible to find two different values that are hashed by H to the same value. Since the receiver 102 is asked to pay only after the escrow server 104 verifies that the hash that R sends is equal to α, the misbehavior of S is discovered before R has to pay.

Assume now that the values [α, β] that escrow server 104 holds do not correspond to the encrypted content 105 and to the corresponding decryption key (for purposes of discussion, assume that the content is defined in the "setting terms" stage). If the receiver 102 receives a value that is not hashed to α, then receiver 102 is not required to pay, as described above. However, it might be the case that the receiver 102 receives a value which does hash to α, and later, after paying and receiving key 106, receiver 102 finds out that the decryption of this value with the key 106 is not content 105. In this case receiver 102 can present the escrow server 104 with the value that it received from sender 100 (which is hashed to α), and demonstrate that decrypting this value using key 106 does not yield the content. Since H is collision resistant, the sender 100 cannot confront this claim by presenting a different value that is hashed to a and is the encryption of content 105 with the key 106.

Proposition 2:

If the receiver 102 is able to obtain the content, and the escrow server behaves according to the protocol, then sender 100 is paid.

The security of the encryption scheme E implies that receiver 102 cannot obtain the content if it is only given an encryption of the content with a randomly chosen key. The protocol defines that the receiver 102 receives the decryption key 106 only after escrow server 104 verifies the receiver's payment. Since escrow server 104 is assumed to follow the protocol, it must then transfer to sender 100 the part of the payment 110 that belongs to it.

In a preferred embodiment, the protocol does not require that the content be revealed to the escrow server 104. The only information that escrow server 104 needs to know is the hash of the encryption of the content, and the decryption key 106. If the encryption algorithm E is deterministic, then knowledge of H($E_K(C)$) and the key releases some information about the content (for example, it enables one to verify whether the content is equal to a certain value). If it is desired to prevent even this leakage of information, the system could use a semantically secure encryption function E. Thus, the basic protocol can be used even if it is preferable that the escrow server 104 not know the content—for example, in cases where receiver 102 and sender 100 exchange some very valuable content and only require the help of escrow server 104 in case of a dispute.

Embodiments of the present invention are designed such that peers have an incentive to take part in the system in order to get the quality assurance that the escrow server 104 provides. However, peers may also swap content between themselves without involving the escrow server 104 if so desired.

A problem that may be encountered when using the basic protocol shown in FIG. 1, is that dishonest parties may share decryption keys. For example, assume that the content is a very large file (e.g., video files). A slightly dishonest party, Eve, having limited resources, might buy the content, but may not want to send it to her friends directly because this would load her communication links. However, she does not mind sending her friends the corresponding decryption key, which is much shorter. Her friends can then ask for the encrypted content from peers who offer it, skip the step in which they contact the escrow server 104 to pay for it, and obtain the decryption key 106 from Eve. This behavior cheats the parties that serve the content, since they end up doing considerable work for free (i.e., transferring the content to Eve's friends).

A solution to this problem is to encrypt the content with a different key every time it is sent to a new user. In such an embodiment, the escrow server could store a separate hash for every encryption, or perform the encryption and the hash of the content by itself for every new encryption. A more efficient mechanism for enabling the server to check the hashes of different encrypted versions of the content is described below.

As previously indicated, the basic scheme can be adapted to many different scenarios in which files are shared. The files can be generated by large content providers which are affiliated with the escrow server, by small independent content providers, or by the party sender 100 that shares the file. The method by which the recipient searches for the file can be arbitrary.

Figure 2:
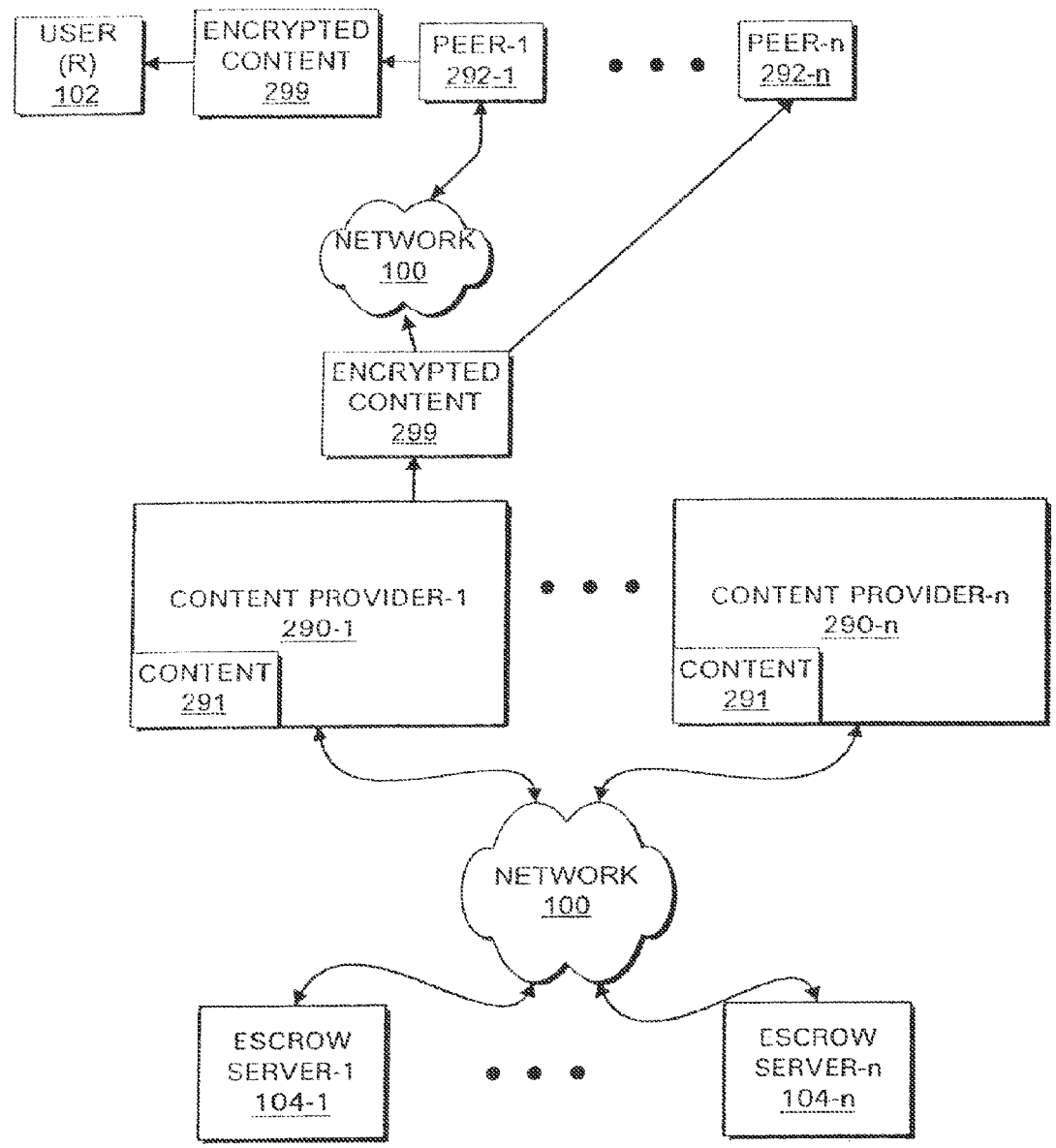
FIG. 2 illustrates an embodiment of the present invention using a peer-to-peer distribution network.

FIG. 2 illustrates an embodiment of the present invention using a peer-to-peer type distribution network in which there are a few, large content providers 290 (e.g., the large music labels or movie studios) that distribute their content 291 through a network of small peers 292. It can be assumed that the content providers 290 have a continuing relationship with the escrow server 104. At an extreme, each content provider 290 can operate an escrow server 104 to handle the distribution of its content 291; however, in other embodiments one or more escrow servers could manage the content of multiple content providers. Before content 291 becomes available through the peer network, the content provider 290 encrypts it with a random key K and provides the hash of the encrypted content and the key to the escrow server. The encrypted copy of the content 299 is therefore certified by the original content provider 290. The content provider 290 then distributes the encrypted copy 299 to peers 292 who are willing to receive the content and possibly to serve it for free. In other words, this is a Napster-like network in which content providers 290 actually pay (or otherwise encourage or allow) peers 292 to do the distribution. When a user 102 asks to receive content 291 from a peer 292 they run the basic protocol described above. The escrow server 104 compares the hash that it receives from peer 102 to the hash of the encrypted copy that it received from the content provider 290. If the hash is correct the transaction takes place.

Note that if the goal is simply to ensure that receiver 102 receives the correct content 291, it could have been achieved using a simple scheme that employs digital signatures that the content provider 290 uses to sign the content. However, the property that such a simple scheme does not achieve is an effectively simultaneous transfer of content 291 from peer 292 to receiver 102, and payment from receiver 102 to server 104 and/or peer 292. If simultaneous transfer is not ensured, then a party that receives the content before paying for it might cheat the peer 292 (or server) and refrain from paying for the content, or else if receiver 102 pays before receiving the content, the peer 292 (or server) might not send receiver 102 the content it paid for. An escrow server that operates according to the protocol described above essentially performs a simultaneous transfer of the content and payment, after first verifying that the content is the required one.

Note that the sharing parties need not know the plaintext version of the content. A party who is interested in making money from distributing the content, but is not interested in obtaining the content for its own use, can keep the encrypted version of the content, $E_K(C)$, and never ask for the key. This does not prevent it from distributing the content to parties who are interested in obtaining it.

The systems and methods of the present invention can also support many small content providers. In such a situation, each content provider can generate content, distribute it (or provide it to other peers for distribution), and use the escrow server to reduce the risk in interacting with peers who are interested in receiving the content. A number of variations could be made to the basic protocol in such scenarios. For example:

The system could support a single content author distributing its creations, or enable the content creator to use other peers as distributors.

The escrow server could check the encrypted version of the content before it begins supporting its distribution, in order to verify that it indeed contains the encryption of the right content. Alternatively, it could store the hash of the encrypted content without checking it, and only request the encrypted content in case of a dispute.

Content servers could send the hash of the encrypted content to the escrow server before beginning to use the system. Alternatively, the hash could be delivered to the escrow server via the receiver of the content, as explained below.

The system might send the same encrypted copy of the content to every recipient, or it might support independent encryption of different copies of the content e.g., as is described below.

In the basic protocol described in connection with FIG. 1, it was assumed that the escrow server 104 had knowledge of $H(E_K(C))$ and K. Assuming that the content is generated by a different party, this information must be communicated (directly or indirectly) from that party to the escrow server. It makes most sense to assume that $[H(E_K(C)), K]$ should be sent from the server S to the escrow server, since server S is held responsible for the quality of the information it sends to the recipient R.

A simple approach might require S to send a separate message containing $[H(E_K(C)), K]$ to the escrow server. This approach makes sense when S distributes many copies of C to many recipients, and sends only a single message with the hash and the decryption key to the escrow server. The drawbacks of this approach are that the escrow server has to store a database of values that correspond to different content objects, and that S has to open a communication channel with the escrow server. The latter problem is especially severe if S sends a different message to the escrow server for every copy of the content that it sends to potential recipients.

Figure 3:
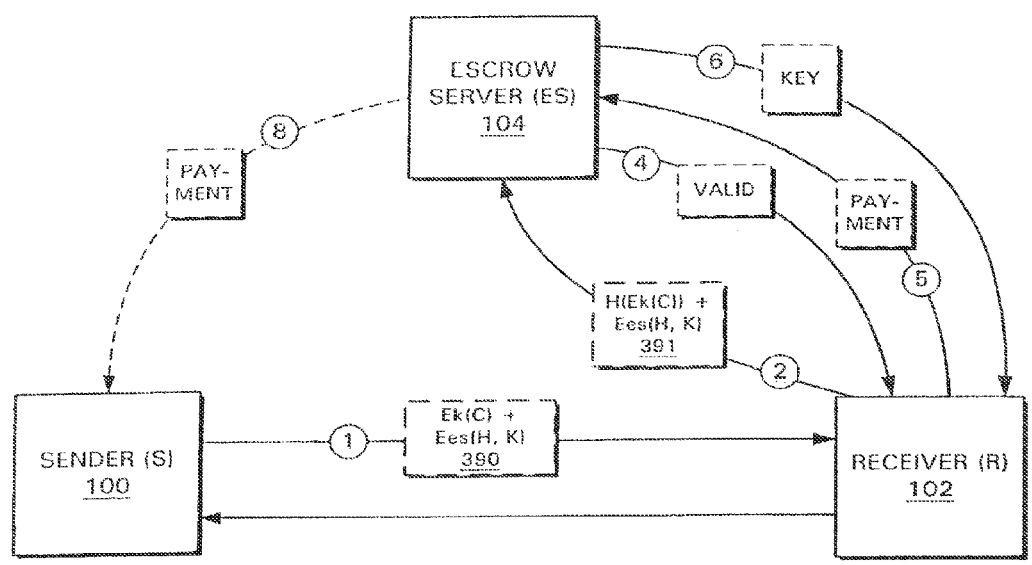
FIG. 3 illustrates a communications protocol in accordance with another embodiment of the present invention.

FIG. 3 (and Table 2) illustrate an embodiment in which S does not need to open a communication channel with the escrow server. Referring to FIG. 3:

The message 390 that the sender 100 sends to receiver 102 contains, in addition to $E_K(C)$, an additional part that contains an encryption of $[H(E_K(C)), K]$ that can only be decrypted by escrow server 104 (e.g., by encrypting it with the escrow server's public key; other exemplary embodiments of the encryption method will be discussed in more detail below (step 1).

The recipient 102 receives this message and forwards to escrow server 104 a message 391 containing the hash, $H(E_K(C))$, as well as the encrypted version of $[H(E_K(C)), K]$ (step 2). The escrow server decrypts the encrypted version of $[H(E_K(C)), K]$ (step 3), and proceeds as in the basic protocol shown in FIG. 1 (step 4 et seq.).

The method shown in FIG. 3 has the advantage of not requiring the sender 100 to send any message directly to the escrow server 104, and not requiring the escrow server 104 to keep large databases of hash values of encrypted content. The recipient 102 is essentially used by the system as a communication channel from sender 100 to the escrow server 104. This makes sense, since sender 100 needs to send a message to receiver 102, who then needs to send a message to the escrow server 104.

TABLE 2

| S | R | ES |
|---|---|---|
| 0 C, Ek(C) | | |
| 1 | Ek(C), Enc(H(Ek(C)), K)→ | |
| 2 | Ek(C) | H(Ek(C))), Enc(H(Ek(C)), K)→ |
| 3 | | Decrypt Enc, and Compare the two hashes |
| 4 | | Continue as before |

If the escrow server is desired or required to examine and/or certify the content before recipients pay for it (rather than simply comparing the hash that was sent from the sender to the hash sent from the recipient), then the schemes described above could, for example, be modified as follows:
1. In an initial stage, S sends the content, C, and the decryption key, K, to the escrow server. The escrow server examines the content, and if it approves of it, the escrow server signs a message $[H(E_K(C)), K]$ and returns it to S.
2. When S sends the encryption of C to R, it accompanies it with the above message, encrypted with the public key of the escrow server.
3. R sends this message to the escrow server together with the hash of the encrypted content it received.

The escrow server decrypts the message using its private key and verifies the signature. If it is correct, it continues as in the protocols described above.

Because R and S might have conflicting motivations, it is possible that R might want to tamper with the message that it is required to transfer to the escrow server for S. It is therefore recommended that the sender encrypt this message with a non-malleable encryption scheme (also known as chosen ciphertext secure in the post-processing mode), such as the Cramer-Shoup scheme or OAEP+. The use of a non-malleable encryption scheme ensures that receivers cannot change the ciphertext in a way that changes the result of the decryption that the escrow server performs. If the scheme described above is used in isolation, then the primary damage that a receiver R can do by changing the message sent from the sender to the escrow server is changing the hash (which results in the escrow server not sending the key K), or changing the key K. In any event, it does not seem that the receiver could benefit from this behavior. At most, it seems that perhaps the receiver could damage the reputation of the server, or take advantage of side effects that depend on the context in which the system is used.

In one embodiment, a public key encryption scheme is used, the decryption key of which is preferably known only to the escrow server. The same public encryption key could be used by all servers to encrypt messages to the escrow server. An alternative approach is to use private key cryptography. The escrow server could generate a basic key $K_{\{Es\}}$ and give each potential server $S_i$ a personal key $K_i$ which is generated as $K_i=F(K_{\{Es\}}, S_i)$, where F is a pseudo-random function keyed by the key $K_{\{Es\}}$. This function could be implemented by the using the encryption scheme E and computing $E_{\{K\{ES\}\}}(S_i)$. The key $K_i$ is only known to the escrow server and to server $S_i$, which uses the key to encrypt messages to the escrow server. If the system employs this method, then servers could use private key encryption which is generally more efficient than public key encryption. A major drawback is that each server should first contact the escrow server in order to obtain its personal key. This is generally less convenient than publishing the public key of the escrow server in a way that makes it available to all potential servers.

As mentioned above, if servers in the system are willing to serve an encrypted version of the content without being paid, trusting that they will be paid when the recipient obtains the decryption key from the escrow server, then a group of dishonest recipients could take advantage of the system without paying the required fees. The source of the problem is that there is a single encrypted version of the content, while the decryption key can be obtained from different sources. For purposes of illustration, two examples are provided below showing how dishonest parties could make use of this feature:

Assume that the content is a video file and that distributing it requires considerable network resources. One user R' can obtain the encrypted version of the file and pay for the decryption key. It might not be economical for R' to distribute the plaintext version of the file to other users, but R' might sell (or give for free) the corresponding decryption key. This enables other users to contact servers, obtain the encrypted version, and decrypt it with the key they obtain from R' without having to contact the escrow server to pay for the decryption key. If this happens, then servers might spend considerable resources distributing encrypted versions of the files without ever being paid for their efforts.

Assume that a dishonest server S' is colluding with a user R'. This user can then obtain the encrypted content from a different server $S_i$ and then contact the ES, present it with the hash of the encrypted content and with a payment, but claim that the content was obtained from S'. In this case, S' gets paid although S is the server that did the work.

One way to solve these problems is to use a self-enforcement encryption scheme (such as the signets scheme of Dwork, Lotspiech and Naor). In these schemes, each user has a personal key that contains some personal information. A single ciphertext message is sent to all users, and the personal key enables each user to obtain a decryption key for the ciphertext. The drawback is that in order to have the self-enforcement property, the length of the decryption key should be of the same order as the content, since otherwise the parties could simply distribute that key.

Therefore, in a preferred embodiment, a different approach is used, in which content is encrypted with a different key each time it is sent to a recipient. A simple implementation of this approach introduces a new problem, however: it seemingly would prevent the escrow server from storing a single hash that can be compared with each possible encryption of the content. Presented below are two exemplary methods that employ error-correcting codes to enable the escrow server to check the hash values of different encryptions. The first method is slightly simpler but requires the escrow server to store a copy of the entire content, whereas the second method does not require the escrow server to store any additional information. Before presenting these methods, two simpler solutions for the hash verification problem are presented.

The simplest solution would be to require the sender to send the escrow server the hash of the current encryption and the corresponding decryption key. The escrow server then compares this hash to the hash it receives from receiver, and continues according to the protocol described above if they are the same. A problem with this solution is that while the escrow server does compare two hashes, it generally will not know whether they correspond to the required content C. Furthermore, it does not know if the encrypted versions that were sent to different recipients are indeed different encryptions of the same content. While the receiver can complain to the escrow server if the decryption of the message does not reveal the required content, there is, in this embodiment, generally no way for the escrow server to certify the content before the receiver is required to pay. It is preferable, of course, to enable the escrow server and the receiver to verify the integrity of the content before processing the receiver's payment.

A different solution requires the escrow server to store the entire content, and to receive from the sender the key K that was used to encrypt the content that was sent to R. The escrow server should then encrypt the content using K, hash the ciphertext, and compare the result with the hash value received from the receiver. If the hashes match, then the escrow server can conclude that the sender sent the receiver the required encryption. A problem with this solution is that the computation overhead for the escrow server is of the same order as the overhead of the sender, since the escrow server has to re-encrypt the content each time the sender sends it to a new recipient. This overhead could be unreasonable for large scale implementations.

A Method Based on Error Correcting Codes

Thus, in some preferred embodiments error correction techniques are used to improve the basic protocol. For example, the content can be divided into k blocks (e.g., each block containing one second, or some other suitable portion, of music or video). These k blocks are encoded using a suitable error-correcting code into n blocks, called the "encoded content". The error correction property ensures that any t of the n encoded blocks enable the reconstruction of the original k content blocks. In general, the parameters must satisfy $k \leq t \leq n$. It is desirable, of course, to have t as close as possible to k. For example, assume that $t=0.75n$, and therefore if one obtains uncorrupted copies of at least 75% of the encoded blocks, it is possible to reconstruct the original content.

In one embodiment, the system operates as follows. First, the sender, S, encodes the content into n blocks and provides these n blocks to the escrow server, who must store them. When the sender sends the content to the receiver, R, it picks a random key K and uses it to independently encrypt each block of the encoded content. It then sends these blocks to R together with the key K, encrypted with the public key of the escrow server. Note that the use of error correcting codes means that the length of the communication from S to R may increase by a factor of n/k.

After receiving this message, R picks a random set of l of the encrypted encoded blocks, where l is a parameter to be defined below. R sends the escrow server this set of encrypted blocks, together with their indices and the encrypted message that is directed from S to the escrow server.

The escrow server decrypts K and uses it to decrypt the l blocks that R sent it. It then compares each of these blocks to the corresponding block of the encoded content which it stores. If any of these comparisons fails, the ES concludes that R did not receive a correctly encoded content, otherwise it concludes that S behaves according to the protocol and sends the key K to R.

To analyze the system, note that it is sufficient for R to obtain t encoded blocks in order to decrypt the content. Since the ES checks l blocks that are randomly chosen by R, the probability that S can prevent R from retrieving the content while not being detected by the escrow server is at most $(t/n)^l$. The value of l should be set to make this probability sufficiently small. For example, $l=2n/(n-t)$ is sufficient in order to lower this probability to about 10%.

The scheme could either use error correction codes or use more efficient erasure codes. Error correction codes have the property that given n blocks, such that at least t of them are correct (although the receiver does not know which ones these are), the receiver can reconstruct the original message. The system could use the list decoding algorithm of Guruswami and Sudan which requires that $t \geq \sqrt{nk}$. In particular, if it is desired that $t=0.75n$, then the system should set $n \geq 16k/9$. This means that the message from S to R is less than twice its original size, and R should send the escrow server 8 blocks in order to bound the error probability at 10%.

Erasure codes are more efficient but require the recipient to identify which blocks are correct and which blocks are corrupt. The system could use such codes if the escrow server was required to sign each encoded block, and S was required to send the signed blocks to R. The escrow server would then verify that the blocks it decrypts are correct and contain its signature. This test ensures that R will, with high probability, be able to recover at least t correct blocks that are signed by the escrow server. The reconstruction operation of R should therefore be to decrypt each block, examine its signature, and, if it is correct, use the block in the reconstruction of the original content. As for the choice of erasure code to be used, one could use Reed-Solomon codes, for which it suffices to set $t=k$, meaning that to get $t=0.75n$ we should set $n=1.33k$, reducing the communication overhead from S to R. A drawback of Reed-Solomon codes is that the computation overhead is essentially $O(n^2)$ (if one does not use FFT methods which are asymptotically more efficient in theory, but generally less efficient in practice). A better choice might be to use the Tornado codes of Luby et al. These codes have a slightly larger t, $t=k(1+\epsilon)$, but the reconstruction time is linear. For all practical purposes, one could set $\epsilon=5\%$, increasing the communication overhead by only 5%.

The main drawback of the method described above is that the escrow server needs to store a copy of the encoded version of every block. The mere requirement of storing a database of information about the various content files is a considerable burden on escrow server. Furthermore, the database could be very large, since the content files are themselves rather large, and their encoded versions are even larger.

Thus, in other preferred embodiments, a verification method is used that does not require the escrow server to store data about the content files. This verification method is based on the escrow server comparing hash values of a certified copy of the encoded blocks with the values it receives from a receiver. A first and simple version can be used if the escrow server performs both the initial certification of the content (namely, running a verification that the encoded blocks represent the description of the content), and the examination of the encrypted content that R receives from S. A slightly more elaborate method can be used if there are different parties running the tasks of certifying the initial encoded versions of the content and checking the encrypted content files that are received by the recipients.

A Verification Method Based on MACs

Another exemplary verification method makes use of message authentication codes, ("MACs"). First, an escrow server chooses a random key $K_M$ to key a MAC, and keeps this key secret. When the protocol is run, party S sends the escrow server the encoded blocks of content C, denoted $B_1, \ldots, B_n$. The escrow server verifies that these blocks encode C. If they do, it returns to S for every $1 \leq i \leq n$, the output of the MAC function, keyed by $K_M$, on the input (\hat{C}, i, $B_i$), where \hat{C} is an agreed upon description of the content (such as a name of a movie, etc.). Namely the escrow server sends S the set of values \{MAC_{K\_M} (\hat{C}, i, $B_i$)\}_{i=1}^n.

When S sends the encrypted content to R, it encrypts each block independently together with the corresponding MAC. R, as in the previous scheme, chooses l random encrypted blocks and sends them to the escrow server, together with their indexes and the description \hat[C] of the content. The escrow server then decrypts these blocks and checks the MAC values using the key $K_M$. If all of the MACs are correct, it decides that the encrypted version of the content is correct.

Intuitively, the security of this scheme is based on the fact that the unpredictability of the MAC function ensures that without knowing the key $K_M$ it is not possible for S to change the encoded block without being identified by the escrow server. The overhead of this scheme is negligible since the size of the output of the MAC and the overhead of computing it are negligible.

A Verification Method Based on Efficient Signatures

The scheme described above uses a MAC function which is secure as long as its key $K_M$ is kept secret. It is reasonable to use this scheme if the same party performs both the certification of the content and the examination of the encrypted copies. If, however, the system includes several escrow servers or other servers that are responsible for certifying content, there is a reasonable chance of one of these servers becoming corrupt. When this happens, the key $K_M$ is compromised and the scheme is no longer secure. This threat can be solved if the parties use public key signatures to certify that the content is correct. Namely, each of the escrow servers has its own private/public key pair, and it uses its private key to sign each encoded block instead of using a MAC. Each escrow server should then know the public key of the other escrow servers, or the public key of a certification authority, and can use them to verify the signatures. This method enables revocation of the keys of a corrupt escrow server or certification authority. However, the overhead of computing the signatures is typically much higher than that of computing MACs.

In order to achieve greater efficiency, the escrow servers could use a hash tree, such as that suggested by Merkle. Namely, the server that certifies the encoded blocks could use a collision-resistant hash function H to generate a binary tree in which the ith leaf is the hash of (i, $B_i$), and each internal node is the hash of its two immediate descendants. The escrow server should then sign the hash of the root of the tree and \hat{C}, and send it to S. S should encrypt the ith block together with the corresponding leaf, and the immediate descendants of the nodes in the root from this leaf to the root. It should also send R the signature generated by the escrow server. In order to verify the encrypted content that it receives from S, R should forward this signature and l randomly chosen encrypted blocks to an escrow server. The escrow server can decrypt the blocks, generate the nodes in the paths from the corresponding leafs to the root, and verify that they match the signed value of the root node.

The only increase in overhead that is incurred by using this version is the additional log n hash values that should be sent with every block. This overhead is rather small since, for all practical purposes, log n could be smaller than 20 and each hash value can be, e.g., 16 bytes long, while the blocks themselves are much longer. The overhead can be reduced if S sends the whole hash tree separately from the blocks, encrypting each node separately. R should forward the escrow server the l log n nodes that enable it to verify the hashes of the l blocks that are chosen by R. The total number of hash values that S sends to R is reduced to 2n, compared to n*log n if each block contains the hash values that are needed in order to verify it. That is, the overhead per block is only two hash values, which are of negligible length.

The system could, of course, use a combination of the first method and the second one. Namely, divide the n encoded blocks into m groups of n/m blocks, arrange each group in a tree of depth log(n/m) and sign the m roots. This combination presents a tradeoff between the number of signatures that have to be computed and sent (which is m), and the number of hash values S should send to R (which is n*log(n/m), if the hash values are encrypted together with the block).

Distributing the Escrow Server

As previously indicated, the system can be designed so that it does not depend on trusting a single escrow server, but rather a group of several such servers. More specifically, a system of n escrow servers could be used, such that a recipient must contact any k of them in order to obtain the key that decrypts the content. In terms of security, this has the following properties:

Collusion between S and any k–1 servers cannot fool the recipient into paying for information which is not the content C.

Collusion between R and any k–1 servers cannot provide R with the decryption key for C without paying S.

The implementation is based on secret sharing techniques. The threshold access structure (k out of n) can be generalized to any monotone access structure in a straightforward way.

Certified Email

Consider a party S that wants to send an email message to party R and obtain an acknowledgement or a proof that R received this message. If the two parties operate alone, then R might not send S a message acknowledging that it has received the message. S might encrypt the message, send R the encrypted version, and require R to send it the acknowledgement before receiving the decryption key. In this case, however, R might claim that it had sent the acknowledgement but never received the decryption key.

Known protocols for solving this problem in the two party case are complicated, rather inefficient, and require many rounds. It is preferable to use a trusted party (TP) for recording the receipt of messages by R. Since this TP handles many messages, its work should be kept simple. The present invention provides systems and methods for achieving this goal.

Preferred embodiments are designed to provide S with proof that R has received the content/message. For ease of explanation, the design described here does not provide R or TP with proof that the message originated from S, but this feature could be readily added using standard authentication methods.

Figure 4:
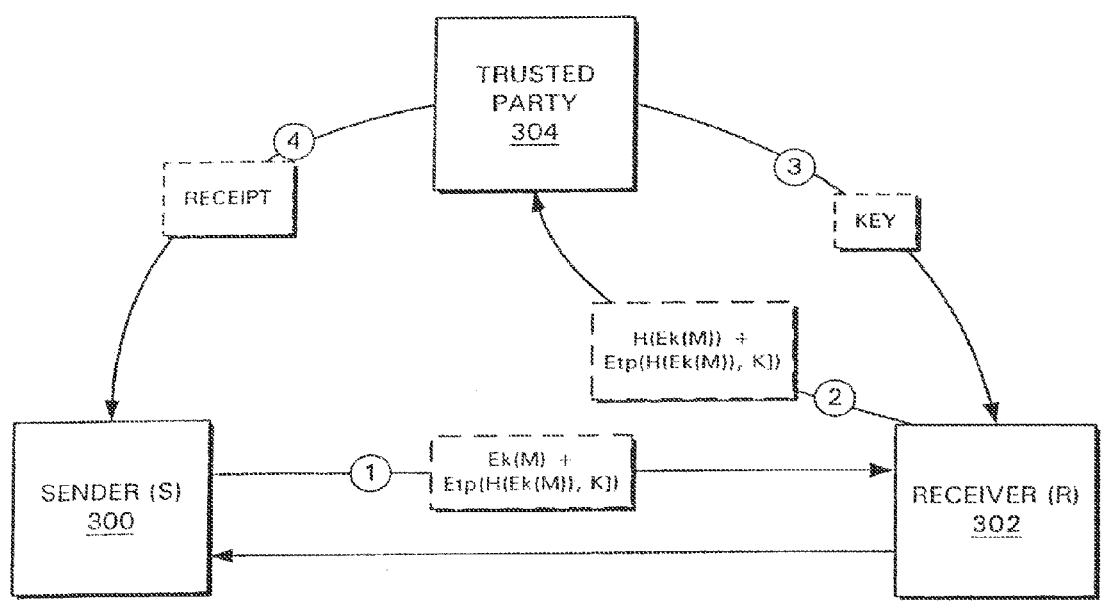
FIG. 4 illustrates a communications protocol in accordance with another embodiment of the present invention.

Suppose that S wants to send a message M to R, and wants to receive a receipt certifying that the message was received. S knows the public key of TP. In one embodiment, the protocol uses the cryptographic primitives that were defined above, and has the following steps (shown in FIG. 4):

- Sender 300 chooses a random key K and uses it to encrypt M, obtaining $E_K(M)$. It then computes the hash, $H(E_K(M))$, and computes the encryption of $[H(E_K(M)), K]$ using the public key of trusted party 304. The sender 300 then sends receiver 302 a message with two parts, the first being $E_K(M)$, and the second being the encryption of $[H(E_K(M)), K]$ with trusted party 304's public key (step 1).
- The receiver 302 computes the hash H of the first part of the message it received, and sends it to the trusted party 304 together with the second part of the message it received (i.e., the encryption of $[H(E_K(M)), K]$) (step 2).
- The trusted party 304 decrypts the second part of the message and compares the hash it contains with the hash received from receiver 302. If the two hashes are different, the trusted party 304 sends receiver 302 a message saying that the message receiver 302 received from sender 300 is invalid. If the two hashes are equal, trusted party 304 sends the key K to receiver 302 (step 3), and sends sender 300 the receipt (e.g., an indication that the receiver received the key, K, and a message encrypted therewith, and possibly also including a hash of the encrypted message $H(E_K(M)))$ (step 4).
- Receiver 302 receives the key from trusted party 304 and uses it to decrypt the message.
- If the receiver 302 does not receive a message from trusted party 304 within a certain predefined time interval, it should contact trusted party 304 and complain that it did not receive the key. If it does not complain within this time frame, the system may, in some embodiments, assume that the receiver received the key. Since trusted party 304 is trusted, and receiver 302 might not be, it can be assumed that if trusted party 304 claims that it sent a message to receiver 302, then the message can safely be assumed to have been received unless receiver 302 complains that it did not receive it.

An alternative design that puts more burden on the server, requires receiver to send a receipt to trusted party 304 immediately after receiving the key K. If it does not send the receipt within a certain time frame, then trusted party 304 contacts receiver 302 (possibly using a more reliable channel) and informs receiver 304 that: (1) the system assumes that receiver 302 received the key K, and (2) if receiver has not received the key, then trusted party 304 can resend it.

If receiver 302 does not succeed in decrypting the message, it can prove this to the trusted party by providing a ciphertext that is hashed to $H(E_K(M))$, and demonstrating that decrypting it with the key does not yield an intelligible message.

If sender 300 wants to prove to trusted party 304 that it sent a certain message M to receiver 302, it should provide trusted party 304 with $E_K(M)$ and demonstrate that: (1) trusted party a receipt containing $H(E_K(M))$, and (2) the key that was contained in the receipt decrypts $E_K(M)$ to M.

Since receiver 302 essentially operates as a communication channel between the sender 300 and the trusted party 304 it can try to alter the message that is sent from the sender 300 to the trusted party 304 (encrypted with trusted party 304's private key). In an extreme case, it can change the encryption of M (say, changing a number from 100 to 0), and change the encryption of the hash of M to match this change. In order to prevent these changes from going undetected, the encryption that the sender performs using the trusted party's public key should be non-malleable.

The system can be generalized to a system with several trusted parties, in which receiver 302 needs to contact a threshold of these parties in order to obtain the key. Only the collusion of a threshold of these parties can provide a faked receipt for the receiver receiving a certain message which it did not receive. The threshold access structure can be generalized to any monotone access structure.

Figure 5:
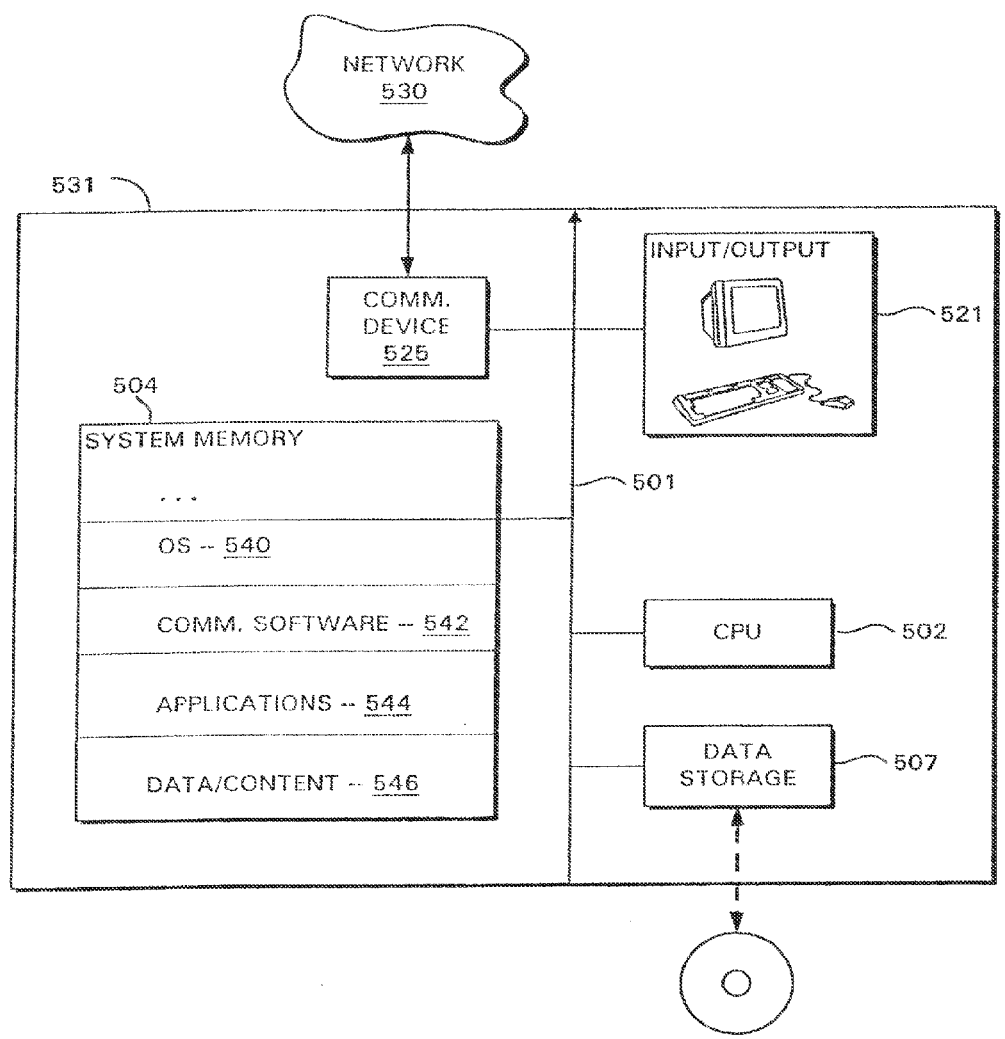
FIG. 5 illustrates a computer system for practicing embodiments of the present invention.

FIG. 5 shows an illustrative computer system 531 for practicing embodiments of the present invention. For example, a system such as that shown in FIG. 5 could be used to implement sender 100, receiver 102, and/or escrow server 104 in FIG. 1. It should be understood, however, that FIG. 5 is provided for purposes of illustration, not limitation, and that other computer systems with additional components and/or some suitable subset of the components illustrated in FIG. 5 could also be used to practice the present invention. Indeed one skilled in the art will appreciate that virtually any type of computing device can be used, including without limitation personal computers, mainframes, cellular telephones, personal digital assistants, and the like. Referring to FIG. 5, illustrative computer system 531 will typically include some or all of the following components:

- a processor 502 for processing information;
- system memory 504, typically comprised of some combination of random access memory (RAM) and read only memory (ROM) for storing information and instructions to be executed or used by processor 502 and/or for storing temporary variables or other intermediate information during execution of instructions by processor 502;
- a data storage device 507 such as a magnetic disk or optical disc and its corresponding drive;
- one or more input/output devices 521, such as a cathode ray tube (CRT) or liquid crystal display (LCD) device; audio speakers; an alphanumeric input device such as a keyboard and/or a cursor control device such as a mouse or a trackball for communicating information and/or command selections to processor 502;
- a communication device 525, such as a modem, a network interface card, or other commercially available network interface device for accessing other computers (e.g., sender 100, receiver 102, and/or escrow server 104) via a network 530 such as the Internet, a private corporate network, a local-area network, a wide-area network, a wireless network, or the like; and
- one or more buses 501 for coupling the aforementioned elements together.

The operation of computer 531 is controlled primarily by programs stored in memory 504 and executed by each computer's processor 502. These programs typically include an operating system, software for performing the communication/transaction protocols described above (e.g., in connection with FIGS. 1-4), one or more other application programs (e.g., an email program, content viewer/player, etc.), data, and the like.

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

The invention claimed is:

1. A method performed by a first computer system associated with a first party, the first computer system comprising a processor and a memory encoded with program instructions that, when executed by the processor, cause the processor to perform the method, the method comprising:
receiving a first hash of a first message from a second computer system associated with a second party, the first hash being generated by the second computer system, the first message comprising content encrypted by a third party with a first key associated with the third party,
receiving an encrypted message from the second computer system, the encrypted message being generated by the third party and comprising a second hash of the first message and the first key, the encrypted message being encrypted using a second key associated with the first party by the third party;
decrypting the encrypted message using the second key to generate a decrypted second hash and decrypted first key;
determining that the first hash and the decrypted second hash are equal; and
based on the determination, sending an indication to a third computer system associated with the third party that the content was received by the second party.

2. The method of claim 1, wherein the first key comprises a key randomly selected by the third party.

3. The method of claim 1, wherein the second key comprises a public encryption key associated with the first party.

4. The method of claim 1, wherein the method further comprises sending, based on the determination, the decrypted first key to the second computer system.

5. The method of claim 4, wherein the method further comprises sending, based on the determination, an indication to the third computer system that the decrypted first key was received by the second party.

6. The method of claim 4, wherein the method further comprises receiving, from the second computer system, an indication that the decrypted first key was received by the second party.

7. The method of claim 4, wherein the method further comprises determining that an indication from the second computer system has not been received within a predefined time period indicating that the decrypted first key was received by the second party and, in response, sending an indication to the second computer system that the decrypted first key was sent.

8. The method of claim 7, wherein the method further comprises resending the decrypted first key to the second computer system in response to determining that the indication from the second computer system has not been received within a predefined time period.

9. The method of claim 1, wherein the content comprises an electronic mail message.

10. A non-transitory computer-readable storage medium storing instructions that, when executed by a processor included in a first computer system associated with a first party, cause the processor to perform a method comprising:
receiving a first hash of a first message from a second computer system associated with a second party, the first hash being generated by the second computer system, the first message comprising content encrypted by a third party with a first key associated with the third party,
receiving an encrypted message from the second computer system, the encrypted message being generated by the third party and comprising a second hash of the first message and the first key, the encrypted message being encrypted using a second key associated with the first party by the third party;
decrypting the encrypted message using the second key to generate a decrypted second hash and decrypted first key;
determining that the first hash and the decrypted second hash are equal; and
based on the determination, sending an indication to a third computer system associated with the third party that the content was received by the second party.

11. The non-transitory computer-readable storage medium of claim 10, wherein the first key comprises a key randomly selected by the third party.

12. The non-transitory computer-readable storage medium of claim 10, wherein the second key comprises a public encryption key associated with the first party.

13. The non-transitory computer-readable storage medium of claim 10, wherein the method further comprises sending, based on the determination, the decrypted first key to the second computer system.

14. The non-transitory computer-readable storage medium of claim 13, wherein the method further comprises sending, based on the determination, an indication to the third computer system that the decrypted first key was received by the second party.

15. The non-transitory computer-readable storage medium of claim 13, wherein the method further comprises receiving, from the second computer system, an indication that the decrypted first key was received by the second party.

16. The non-transitory computer-readable storage medium of claim 13, wherein the method further comprises determining that an indication from the second computer system has not been received within a predefined time period indicating that the decrypted first key was received by the second party and, in response, sending an indication to the second computer system that the decrypted first key was sent.

17. The non-transitory computer-readable storage medium of claim 16, wherein the method further comprises resending the decrypted first key to the second computer system in response to determining that the indication from the second computer system has not been received within a predefined time period.

18. The non-transitory computer-readable storage medium of claim 10, wherein the content comprises an electronic mail message.

* * * * *